(12) United States Patent
Konada et al.

(10) Patent No.: US 12,370,857 B2
(45) Date of Patent: Jul. 29, 2025

(54) PREVIEW ROAD SURFACE DETECTOR, SUSPENSION CONTROLLER, AND PREVIEW ROAD SURFACE DETECTION METHOD

(71) Applicant: HONDA MOTOR CO., LTD., Tokyo (JP)

(72) Inventors: Kazuya Konada, Saitama (JP); Takashi Yanagi, Saitama (JP); Ryosuke Yamazaki, Saitama (JP); Takehito Masubuchi, Saitama (JP)

(73) Assignee: HONDA MOTOR CO., LTD, Tokyo (JP)

( * ) Notice: Subject to any disclaimer, the term of this patent is extended or adjusted under 35 U.S.C. 154(b) by 134 days.

(21) Appl. No.: 18/474,237

(22) Filed: Sep. 26, 2023

(65) Prior Publication Data

US 2024/0109387 A1    Apr. 4, 2024

(30) Foreign Application Priority Data

Sep. 30, 2022  (JP) ................. 2022-157900

(51) Int. Cl.
*B60G 17/0165*  (2006.01)
*B60G 17/017*  (2006.01)
(Continued)

(52) U.S. Cl.
CPC ......... *B60G 17/019* (2013.01); *B60G 17/017* (2013.01); *B60G 17/018* (2013.01);
(Continued)

(58) Field of Classification Search
CPC ............. B60G 17/0165; B60G 17/017; B60G 17/018; B60G 17/019; B60G 2400/82;
(Continued)

(56) References Cited

U.S. PATENT DOCUMENTS 4,936,604 A * 6/1990 Kawagoe ............ B60G 17/018
280/5.514
2008/0021611 A1 * 1/2008 Hiebert ............ B60G 17/0185
701/37
(Continued)

FOREIGN PATENT DOCUMENTS

JP      H0596922 A      4/1993
JP      H07179114 A     7/1995

*Primary Examiner* — Erick R Solis
(74) *Attorney, Agent, or Firm* — CKC & PARTNERS CO. LLC

(57) ABSTRACT

A preview road surface detector capable of discontinuing predictive control is provided, which suppresses the energy consumption required to determine whether predictive control should be discontinued. The preview road surface detector includes: a distance sensor provided on a vehicle body member, the distance sensor detecting a value related to a distance between the vehicle body member and a measurement point on a road surface ahead of a vehicle, the measurement point corresponding to at least part of a road surface contact portion of a wheel; and a distance calculator that calculates a road surface distance as the distance from the vehicle body member to the measurement point, based on a detection value detected by the distance sensor, in which the distance sensor is deactivated under a predetermined condition.

9 Claims, 5 Drawing Sheets

(51) Int. Cl.
*B60G 17/018* (2006.01)
*B60G 17/019* (2006.01)

(52) U.S. Cl.
CPC .... *B60G 2400/82* (2013.01); *B60G 2400/821* (2013.01); *B60G 2400/954* (2013.01); *B60G 2600/182* (2013.01); *B60G 2600/184* (2013.01)

(58) Field of Classification Search
CPC ........ B60G 2400/821; B60G 2400/954; B60G 2600/182; B60G 2600/184
USPC .......................................................... 701/37
See application file for complete search history.

(56) References Cited

U.S. PATENT DOCUMENTS

| | | | | |
|---|---|---|---|---|
| 2008/0033684 | A1* | 2/2008 | Vian | F41G 7/303 |
| | | | | 701/1 |
| 2014/0316637 | A1* | 10/2014 | Rhode | B60G 17/0182 |
| | | | | 701/29.1 |
| 2019/0077406 | A1* | 3/2019 | Dudar | B60W 40/06 |
| 2020/0055363 | A1* | 2/2020 | Paiva | B60G 17/0182 |
| 2023/0243959 | A1* | 8/2023 | Donderici | G01S 13/87 |
| | | | | 342/70 |
| 2023/0410528 | A1* | 12/2023 | Weston | B60G 17/0182 |

* cited by examiner

FIG. 5

| CATEGORY | | EXAMPLES OF SCENES | EXAMPLES OF DETERMINING TO DEACTIVATE PREVIEW SENSOR | EXAMPLES OF RESTORATION |
|---|---|---|---|---|
| (1) PREVIEW SENSOR VALUE SERVING NO PURPOSES | | VEHICLE COMES TO A STOP OR EPB IS IN OPERATION | EPB IS IN OPERATION OR WHEEL SPEED SENSOR INDICATES ZERO FOR ANY OF WHEELS | WHEN EPB STOPS OPERATION, OR WHEN IT IS DETERMINED, USING WHEEL SPEED SENSOR, THAT VEHICLE IS IN MOTION |
| | | STEERING ANGLE EQUAL TO OR GREATER THAN CERTAIN DEGREE | STEERING ANGLE INFORMATION IS AT OR ABOVE THRESHOLD | WHEN STEERING ANGLE FALLS BELOW THRESHOLD |
| | | VEHICLE MOVING IN REVERSE | REVERSE OPERATION FLAG BEING RECEIVED (CAN:VSA_MAEPS_REVERSE_F) | WHEN REVERSE OPERATION FLAG GOES OFF, DETERMINING THAT VEHICLE V IS MOVING AHEAD |
| | | SNOWING | REFERRING TO WEATHER INFORMATION FROM CAR NAVIGATION SYSTEM | WHEN WEATHER INFORMATION INDICATES SOMETHING OTHER THAN SNOW |
| | | ROAD SURFACE FREEZING | TEMPERATURE MEASURED BY OUTSIDE TEMPERATURE SENSOR IS AT OR BELOW THRESHOLD (EXAMPLE: 2 DEGREES CELSIUS OR BELOW) | WHEN TEMPERATURE MEASURED BY OUTSIDE TEMPERATURE SENSOR IS AT OR ABOVE THRESHOLD |
| (2) INAPPLICABLE DUE TO HARSH ENVIRONMENTAL CONDITIONS | | CASES WHERE ROAD SURFACE DEFORMS WHEN VEHICLE CROSSES OVER ROAD SURFACE SUCH AS MUDDY ROAD SURFACE OR SANDY BEACH | WHEN BODY G-FORCE CONTINUES TO BE AT OR ABOVE THRESHOLD EVEN THOUGH PREVIEW CONTROL IS ACTIVE | WHEN BODY G-FORCE IS AT OR BELOW THRESHOLD |

FIG. 6

| CATEGORY | EXAMPLES OF SCENES | EXAMPLES OF DETERMINING TO DEACTIVATE PREVIEW SENSOR | EXAMPLES OF RESTORATION |
|---|---|---|---|
| (3) SYSTEM OPERATING BEYOND ITS LIMITS | DRIVING ON ROUGH ROADS SUCH AS MOUNTAIN TRACKS | WHEN BODY G-FORCE CONTINUES TO BE AT OR ABOVE THRESHOLD | WHEN BODY G-FORCE IS AT OR BELOW THRESHOLD |
| (4) SYSTEM MALFUNCTIONING | DIRT OR OTHER CONTAMINANTS ADHERING TO SENSOR | WHEN SENSOR VALUE IS OVER/UNDER | OBTAIN SENSOR VALUES AT REGULAR INTERVAL, AND WHEN SENSOR VALUES ARE SUCCESSFULLY OBTAINED WITHIN SPECIFIED RANGE (FOR EXAMPLE EVERY 30 SECONDS) |
| | DIRT OR OTHER CONTAMINANTS ADHERING TO SENSOR | WHEN SENSOR VALUE IS CONSTANT FOR CERTAIN PERIOD OF TIME | OBTAIN SENSOR VALUES PLURAL TIMES AT REGULAR INTERVAL, AND WHEN VALUES CHANGE WITHIN SPECIFIED RANGE (FOR EXAMPLE THREE TIMES EVERY 30 SECONDS) |
| | SENSOR MALFUNCTIONING | WHEN NO RESPONSES ARE RECEIVED FROM SENSOR | WHEN REACTIVATED BY IGNITION, OR WHEN SENSOR RESTARTS RESPONDING AFTER VEHICLE COMES TO A STOP |

PREVIEW ROAD SURFACE DETECTOR, SUSPENSION CONTROLLER, AND PREVIEW ROAD SURFACE DETECTION METHOD

CROSS REFERENCE TO RELATED APPLICATIONS

This application claims the benefit of priority to Japanese Patent Application No. 2022-157900 filed on Sep. 30, 2022. The entire contents of this application are hereby incorporated herein by reference.

BACKGROUND OF THE INVENTION

Field of the Invention

The present invention relates to a preview road surface detector, a suspension controller, and a preview road surface detection method.

Related Art

Recently, research and development contributing to energy efficiency is being conducted to ensure that more people can have access to affordable, reliable, sustainable, and advanced energy.

Conventional active suspensions for vehicles such as automobiles are known, and one of such active suspensions includes: a road surface detector that detects road surface displacement ahead using an optical sensor; a vehicle speed detector that detects the speed of the vehicle; a vertical acceleration detector installed on the vehicle body at a position corresponding to the front wheels, the vertical acceleration detector detecting vertical acceleration of the vehicle body; and a storage that stores information on road surface displacement and vertical acceleration in a time series, in which, when it is determined that the detected road surface displacement is abnormal, vertical acceleration of a portion corresponding to the rear wheels of the vehicle body at the time of the vehicle having travelled a distance equivalent to the wheelbase is estimated from the vertical acceleration stored in the storage, based on the wheelbase and the vehicle speed, and then the actuator of the rear wheels is predictively controlled in accordance with the estimated vertical acceleration (refer to Patent Document 1).

In such active suspensions, there may be cases where it is preferable not to perform predictive control, depending on the situations of the vehicle and the road surface. Therefore, for instance, technologies have been proposed which measure parameters such as the distance from the road surface to the wheels and discontinue predictive control or the like in accordance with the measurement results (refer to Patent Document 2).

Patent Document 1: Japanese Unexamined Patent Application, Publication No. H05-96922
Patent Document 2: Japanese Unexamined Patent Application, Publication No. H07-179114

SUMMARY OF THE INVENTION

However, with conventional technologies, even if predictive control is discontinued or the like, the energy consumption of the system remains high, which is a problem. Such a system, for example, measures a distance from the road surface to the wheels using a distance sensor, and performs various controls and other processes based on the measured results. Since a certain amount of energy is consumed by the distance sensor among these processes, the energy consumption required in the system has increased.

In order to solve the above-mentioned problems, the present invention aims to provide a preview road surface detector capable of deactivating a distance sensor, thus suppressing the energy consumption required. Further, the present invention contributes to the energy efficiency.

(1) In order to solve the above-mentioned problems, the preview road surface detector of the present invention includes a distance sensor provided on a vehicle body member, the distance sensor detecting a value related to a distance between the vehicle body member and a measurement point on a road surface ahead of a vehicle, the measurement point corresponding to at least part of a road surface contact portion of a wheel; and a distance calculator that calculates a road surface distance as the distance from the vehicle body member to the measurement point, based on a detection value detected by the distance sensor, in which the distance sensor is deactivated under a predetermined condition.

With the preview road surface detector as such, a preview road surface detector capable of deactivating a distance sensor can be provided, thus suppressing the energy consumption required. In addition, the energy consumption of the entire system can be reduced. Further, malfunctions of the preview road surface detector can be suppressed.

(2) The preview road surface detector of the present invention can deactivate the distance sensor in at least one of the following situations: when the vehicle comes to a stop, when a steering angle is equal to or greater than a predetermined angle, or when the vehicle moves in reverse.

With the preview road surface detector as such, the distance sensor can be deactivated when the calculated road surface distance serves no purposes. As a result, the system energy consumption can be reduced.

(3) The preview road surface detector of the present invention can deactivate the distance sensor when the vehicle moves ahead after coming to a stop, when the vehicle moves ahead after moving in reverse, or when the steering angle having been equal to or greater than a predetermined angle falls below the predetermined angle.

The preview road surface detector as such can restore the preview control at appropriate timing.

(4) The preview road surface detector of the present invention can deactivate the distance sensor when vertical acceleration of the vehicle body member continues to be equal to or greater than a threshold for a predetermined period of time or longer, or when a battery voltage is less than or equal to a predetermined voltage.

The preview road surface detector as such deactivates the distance sensor when the system is operating beyond its limits. As a result, malfunctions of the system can be suppressed. Further, energy consumption of the system can be reduced.

(5) The preview road surface detector of the present invention can deactivate the distance sensor when a weather around the vehicle is determined to be snow, when an outside temperature of the vehicle is less than or equal to a predetermined temperature, or when at least one of ABS or VSA is in operation.

The preview road surface detector as such deactivates the distance sensor in situations where extreme environmental conditions are anticipated. As a result, malfunctions of the system can be suppressed. Further, energy consumption of the system can be reduced.

(6) The preview road surface detector of the present invention can deactivate the distance sensor when the detection value of the distance sensor is at least one of constant, under, or over for a predetermined period of time or longer.

The preview road surface detector as such deactivates the distance sensor in situations where system malfunctions are predicted
As a result, malfunctions of the system can be suppressed. Further, energy consumption of the system can be reduced.

(7) In a case in which the distance sensor is deactivated in any one of the aforementioned (4) to (6), the preview road surface detector of the present invention can activate the distance sensor when a predetermined condition having deactivated the distance sensor is resolved, or when the vehicle comes to a stop after the distance sensor is deactivated.

The preview road surface detector as such can activate the distance sensor and attempt to restore the preview control at appropriate timing.

(8) The preview road surface detector of the present invention can allow the predetermined condition to include at least one of: a condition indicating a low reliability of the road surface distance calculated; or a condition indicating a case in which control of the vehicle body member using the road surface distance calculated is unnecessary.

The preview road surface detector as such can deactivate the distance sensor in situations where deactivation is desired.

(9) A suspension controller of the present invention can control an operation of an active suspension, based on the road surface distance calculated using the preview road surface detector of any one of the aforementioned aspects (1) to (8), in which the suspension controller can control an operation of the active suspension by way of skyhook control or damping control when the distance sensor is deactivated.

The suspension controller as such can maintain comfort through certain feedback control, even in a state where the distance sensor has been deactivated.

(10) A preview road surface detection method of the present invention includes: a detecting step of detecting a value related to a distance between a vehicle body member and a measurement point on a road surface ahead of a vehicle, the measurement point corresponding to at least a central portion of a road surface contact portion of a wheel; and a calculating step of calculating a road surface distance, which is the distance from the vehicle body member to the measurement point, based on a detection value detected in the detecting step, in which the method further includes: a situation monitoring step of monitoring a situation of the vehicle; and a determining step of determining whether the detecting step should be executed, based on the situation of the vehicle monitored in the situation monitoring step.

With the preview road surface detection method as such, a preview road surface detection method capable of discontinuing predictive control can be provided, which suppresses the energy consumption required to determine whether predictive control should be discontinued.

Note that the above-described (1) to (10) can be arbitrarily combined as needed.

According to the present invention, a preview road surface detector capable of discontinuing predictive control can be provided, which suppresses the energy consumption required to determine whether predictive control should be discontinued.

BRIEF DESCRIPTION OF THE DRAWINGS

FIG. 5 is a table illustrating an example of conditions for switching on or off the preview control; and FIG. 6 is another table illustrating an example of conditions for switching on or off the preview control.

Figure 1:
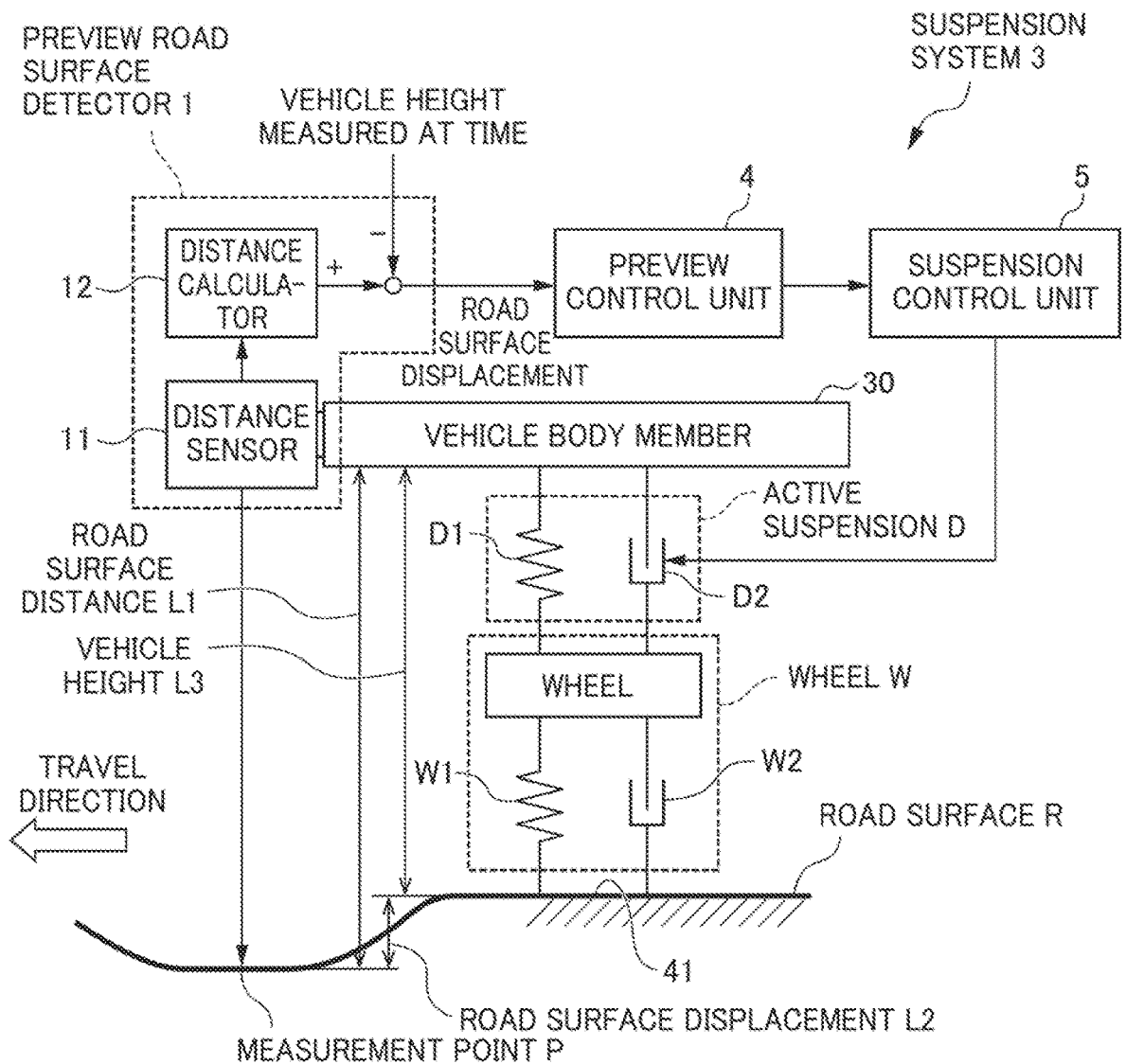
FIG. 1 is a diagram illustrating an overview of a suspension system of a vehicle.

DETAILED DESCRIPTION OF THE INVENTION (Suspension System)
Embodiments of the present invention will now be described with reference to the accompanying drawings. FIG. 1 is a diagram illustrating an overview of a suspension system 3 of a vehicle to which a preview road surface detector 1 of the present embodiment is applied.

The suspension system 3 includes the preview road surface detector 1, a preview control unit 4, a suspension control unit 5, a vehicle body member 30, an active suspension D, and wheels W. Further, the preview road surface detector 1 is provided with a distance calculator 12 and a distance sensor 11.

Figure 2:
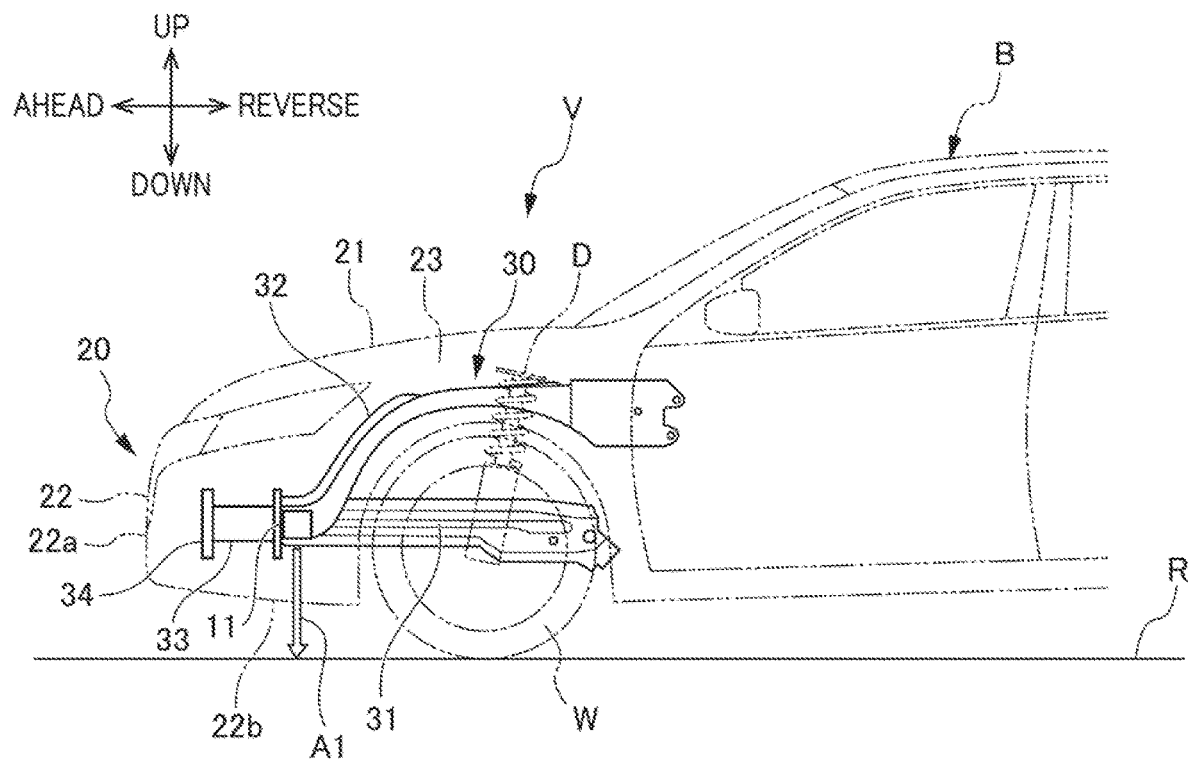
FIG. 2 is a side view of the vehicle, illustrating an installation structure of a distance sensor.

In the suspension system 3, the suspension control unit 5 controls the active suspension D to stabilize the posture of the vehicle body member 30. This control is performed based on, for example, the Skyhook theory.
(Road Surface Displacement)
When controlling the active suspension D, first, the preview road surface detector 1 acquires a road surface displacement L2 ahead of the vehicle. Here, the road surface displacement L2 refers to a distance between the road surface R currently in contact with the wheel W and the measurement point P, in the direction vertical to the road surface R. Note that the road surface R refers to the ground in contact with the wheel W. The measurement point P refers to a point on the ground where the distance sensor 11 measures the distance. The road surface displacement L2 is also referred to as predictive information.
(Preview Control Unit)
Next, the preview control unit 4 acquires the road surface displacement L2 from the preview road surface detector 1. Then, based on the value of the road surface displacement L2, the active suspension D is controlled to reduce body vibrations caused by road surface inputs. In this manner, the suspension system 3 aims to improve the ride comfort of the vehicle.
(Configuration of Vehicle)
Referring also to FIG. 2, the suspension system 3 is described more specifically. FIG. 2 is a side view of the vehicle V, illustrating the installation mechanism of the distance sensor 11. The vehicle V is provided with a vehicle body B and wheels W. The members constituting the vehicle body B include the vehicle body member 30. Wheels W are provided on the lower side of the vehicle body member 30. FIG. 2 illustrates a front wheel of the wheels W. The front wheels include a left-side wheel and a right-side wheel. FIG. 2 illustrates the left-side wheel among the left and right wheels.
(Vibration Model)
The active suspension D, as well as the tire portion of the wheels W, absorbs unevenness of the road surface R. The suspension control unit 5, as illustrated in FIG. 1, controls the tire portion of the wheels W, as a vibration model. This vibration model is a parallel arrangement of a spring W1 and a damper W2.

(Active Suspension)

The active suspension D can control the damping force using a suspension spring D1 and a hydraulic actuator. Alternatively, the active suspension D can be configured with the suspension spring D1 and a variable damper D2 arranged in parallel. The variable damper D2 is a damper that controls the damping force and the thrust by way of an electromagnetic force. The active suspension D is provided between the vehicle body member 30 and the wheel W.

(Suspension Control Unit)

The suspension control unit 5 controls the variable damper D2 as the control target.

(Preview Road Surface Detector)

The preview road surface detector 1 is installed on the vehicle body member 30. The preview road surface detector 1 is provided with a distance sensor 11 and a distance calculator 12.

(Distance Sensor) The distance sensor 11 measures a distance between the vehicle body member 30 and the measurement point P on the road surface R. The distance between the vehicle body member 30 and the measurement point P on the road surface R is referred to as a road surface distance L1. This measurement is performed using a technique such as ultrasound, laser light, or millimeter-wave radar.

(Distance Calculator)

The distance calculator 12 calculates the road surface displacement L2 ahead of the wheel W, based on the measurement values of the distance sensor 11. Specifically, the preview road surface detector 1 calculates the road surface displacement L2 ahead of the wheel W by subtracting a vehicle height L3 measured at the time from the road surface distance L1 calculated by the distance calculator 12. The vehicle height L3 is a distance between the vehicle body member 30 and the road surface R at the road surface contact portion 41.

In other words, ROAD SURFACE DISTANCE L1−VEHICLE HEIGHT L3=ROAD SURFACE DISPLACEMENT L2. Note that when calculating the road surface displacement L2, the vehicle height L3 can also be obtained by referencing a value calculated by the suspension control unit 5 as a control variable.

(Time Required to Arrive)

The preview control unit 4 calculates the time required for the wheel W to arrive at the measurement point P in the road surface displacement L2, based on the vehicle speed at the time of measuring the road surface displacement L2 and the distance from the tire contact point to the measurement point P in the road surface displacement L2 in the travel direction of the vehicle V. This time required is referred to as "time required to arrive". Note that the distance from the tire contact point to the measurement point P in the road surface displacement L2 in the travel direction of the vehicle V can also be obtained by referencing information on the installation position of the distance sensor 11.

(Predictive Information)

The preview road surface detector 1 and the preview control unit 4 can periodically perform the aforementioned process for obtaining the road surface displacement L2. In this manner, predictive information on the road surface displacement L2 can be obtained. Predictive information refers to information on the road surface condition ahead of the wheel W, which will be overpassed after a predetermined time, as described earlier. The road surface condition includes factors such as the road surface displacement L2 and the unevenness of the road surface R.

The suspension control unit 5 controls the active suspension D, based on the predictive information on the road surface displacement L2. Therefore, the suspension control unit 5 can improve the ride comfort of the vehicle V.

(Installation of Preview Road Surface Detector)

The preview road surface detector 1 of the present embodiment includes the distance sensor 11 and the distance calculator 12, as described above. Among these, the distance sensor 11 is installed on the vehicle body member 30. On the other hand, the distance calculator 12 is implemented in the Electronic Control Unit (ECU) of the vehicle V.

(Installation of Distance Sensor)

Installation of the distance sensor 11 will be specifically described based on FIG. 2. Note that an installation structure of the distance sensor 11, as well as other structures of the vehicle V illustrated in FIG. 2, is simplified for the convenience of explanation. Installation of the distance sensor 11 is not limited to the one described below.

(Definition of Directions)

Note that the travel direction of the vehicle V is referred to as 'ahead' direction, the reverse direction as 'reverse' direction, the upward vertical direction as 'up' direction, the downward vertical direction as 'down' direction, and the widthwise direction as 'left' and 'right' directions for the purpose of explanation. The installation structure of the vehicle sensors such as the distance sensor 11 is essentially bilaterally symmetrical. Therefore, the following description will primarily focus on one side (the left side) while omitting the description of the other side (the right side) as appropriate.

FIG. 2 is a side view of the vehicle V, illustrating the installation structure of the distance sensor 11. Note that the outline of the vehicle V is indicated by the phantom line in FIG. 2.

(Vehicle Body)

The vehicle V includes the vehicle body B as its main constituent. The vehicle body B includes, in addition to the vehicle body member 30, the exterior member 20 and the distance sensor 11, etc. The distance sensor 11 is fixed to the vehicle body member 30.

The exterior member 20 is a member that forms the outer portion of the vehicle V. The exterior member 20 forms the outer shell of the vehicle V. On the other hand, the distance sensor 11 is a device that detects the road surface condition.

(Vehicle)

As long as the vehicle V is an automobile provided with the vehicle body member 30, the exterior member 20, and the distance sensor 11 as described above, the specific type and model of the vehicle are not limited in particular. The vehicle V can, for example, be a passenger car, bus, truck, utility vehicle, or the like.

Each member will be described below in more detail.

(Vehicle Body Member)

The vehicle body member 30 has the function of supporting the exterior member 20. Moreover, the vehicle body member 30 is composed of members such as a front side frame 31, an upper member 32, a bumper beam extension 33, and a bumper beam 34. Note that the front side frame 31, the upper member 32, and the bumper beam 34 may be referred to as frame members.

(Exterior Member)

The exterior member 20 includes an engine hood 21, a front bumper 22, and a front fender 23. Note that the front bumper 22 may simply be referred to as "bumper".

The engine hood 21 is a panel member that covers the upper surface of a portion ahead of the windshield. The front bumper 22 is located on the front side of the vehicle V and is composed of, for example, a panel member made of synthetic resin. In addition, the front bumper 22 includes a front portion 22a where an air intake and the like are provided, and a bottom portion 22b that extends rearward from the lower end of the front portion 22a. The front fender 23 is a panel member that covers the area around the wheel W.

(Installation of Distance Sensor)

The distance sensor 11 is a sensor that detects the condition of the road surface R ahead of the vehicle V. The distance sensor 11 is fixed to the upper member 32. The upper member 32 is a member that constitutes the vehicle body member 30, as described above. The upper member 32 is arranged ahead of the wheel W.

More specifically, the distance sensor 11 is installed on the outer side surface of the upper member 32 in the vehicle width direction. The distance sensor 11 is located at the front end of the upper member 32 in the longitudinal direction.

(Configuration of Distance Sensor)

The distance sensor 11 of the present embodiment is configured to detect the road surface distance L1 at the road surface R immediately ahead of the wheel W, as indicated with the arrow A1 in FIG. 2. The road surface distance L1 is a distance between the vehicle body member 30 and the measurement point P on the road surface R. The distance sensor 11 can be appropriately selected from various types of sensors such as radar-based, camera-based, and laser-based sensors. The distance sensor 11 does not need to be composed of a single type of sensor. The distance sensor 11 can be configured by combining plural types of sensors, such as a camera-based sensor and a laser-based sensor, for example.

(Sensor Element)

Figure 3:
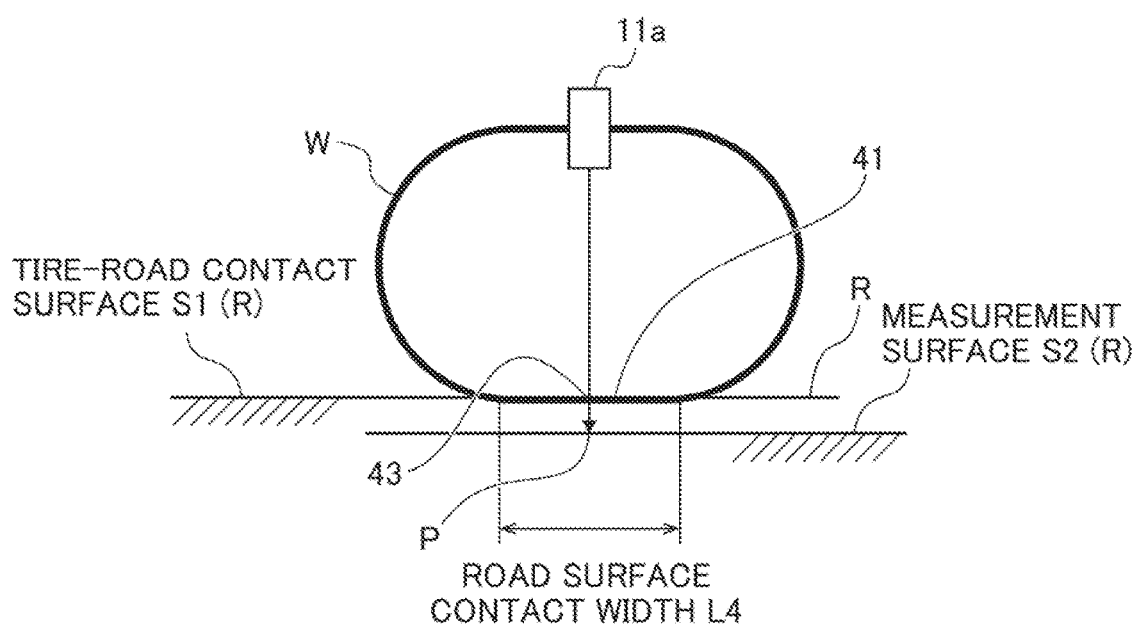
FIG. 3 is a view of the vehicle observed from the front of a wheel, illustrating a configuration of the distance sensor.

Next, detection of a distance using the distance sensor 11 will be described based on FIG. 3. FIG. 3 illustrates an appearance of the distance sensor 11 when the wheel W is viewed from ahead of the vehicle. The distance sensor 11 of the present embodiment is provided with a sensor element 11a. The distance sensor 11 is provided with at least one sensor element, which serves as a component for detecting distances. The method of detecting distances by way of individual sensor elements is not limited in particular. Various approaches can be employed as the detection method, such as a method based on the principle of triangulation, a method that converts the reflected intensity of emitted infrared light into a distance, a method that calculates a distance based on the flight time of laser light, and so forth.

(Detection by Sensor Element)

Next, detection of a distance by the sensor element 11a will be described. As illustrated in FIG. 3, the wheel W is in contact with a tire-road contact surface S1 of the road surface R. As illustrated in FIG. 1, the distance sensor 11, specifically the sensor element 11a, detects a distance between the vehicle body member 30 and the measurement point P (indicated by the arrow tip in FIG. 3 and marked as the point P in FIG. 1) that is the measurement point on the measurement surface S2 ahead of the vehicle V and corresponding to the central portion 43 of the wheel W in the road surface contact width L4.

(Calculation of Road Surface Distance)

The distance calculator 12 (illustrated in FIG. 1) of the preview road surface detector 1 calculates a road surface distance, based on the value detected by the sensor element 11a.

The active suspension D of the vehicle V is controlled based on the condition of the road surface R as detected by the distance sensor 11. Note that the condition of the road surface R may simply be referred to as "road surface condition".

(Other Configurations)

FIG. 3 illustrates a configuration in which one distance sensor 11 is provided with one sensor element 11a. However, the number of sensor elements provided in one distance sensor 11 is not limited to one. One distance sensor 11 may be provided with two or more sensor elements. For example, the distance sensor 11 may be provided with three sensor elements. In cases where a plurality of sensor elements are provided, a road surface distance can be calculated, for example, based on the average value of the values detected by the three sensor elements. The detection accuracy of road surface displacement can be improved by using a plurality of sensor elements.

(Deactivation of Distance Sensor)

In the preview road surface detector 1 of the present embodiment, the distance sensor 11 can be deactivated under predetermined conditions. The distance sensor 11 is responsible for part of the plurality of processes in the preview control. Therefore, when the preview control is switched off, the operation of the distance sensor 11 is also deactivated accordingly. In other words, when the preview control is switched off under predetermined conditions, the operation of the distance sensor 11 is also deactivated accordingly.

Here, the predetermined conditions under which the preview control is switched off can, for example, include cases where the preview sensor values serve no purposes, cases where the preview sensor is inapplicable due to harsh environmental conditions around the vehicle V, cases where the preview sensor system is operating beyond its limits, and cases where the preview sensor system is malfunctioning or the like.

In other words, the predetermined conditions can include at least one of: the condition indicating a low reliability of the calculated road surface distance; or the condition indicating a case in which control of the vehicle body member 30 using the calculated road surface distance is unnecessary.

(Categories of Predetermined Conditions)

In the present embodiment, the predetermined conditions are classified into four categories. Specifically, the category (1) is defined as the case where the preview sensor value serves no purposes, the category (2) is defined as the case where the preview sensor is inapplicable due to harsh environmental conditions around the vehicle V, the category (3) is defined as the case where the preview sensor system is operating beyond its limits, and the category (4) is defined as the case where the preview sensor system is malfunctioning.

The deactivated distance sensor can be resumed under predetermined conditions. In other words, the switched-off preview control can be switched on under predetermined conditions. The following will be described in order.

(Flow of Process)

Figure 4:
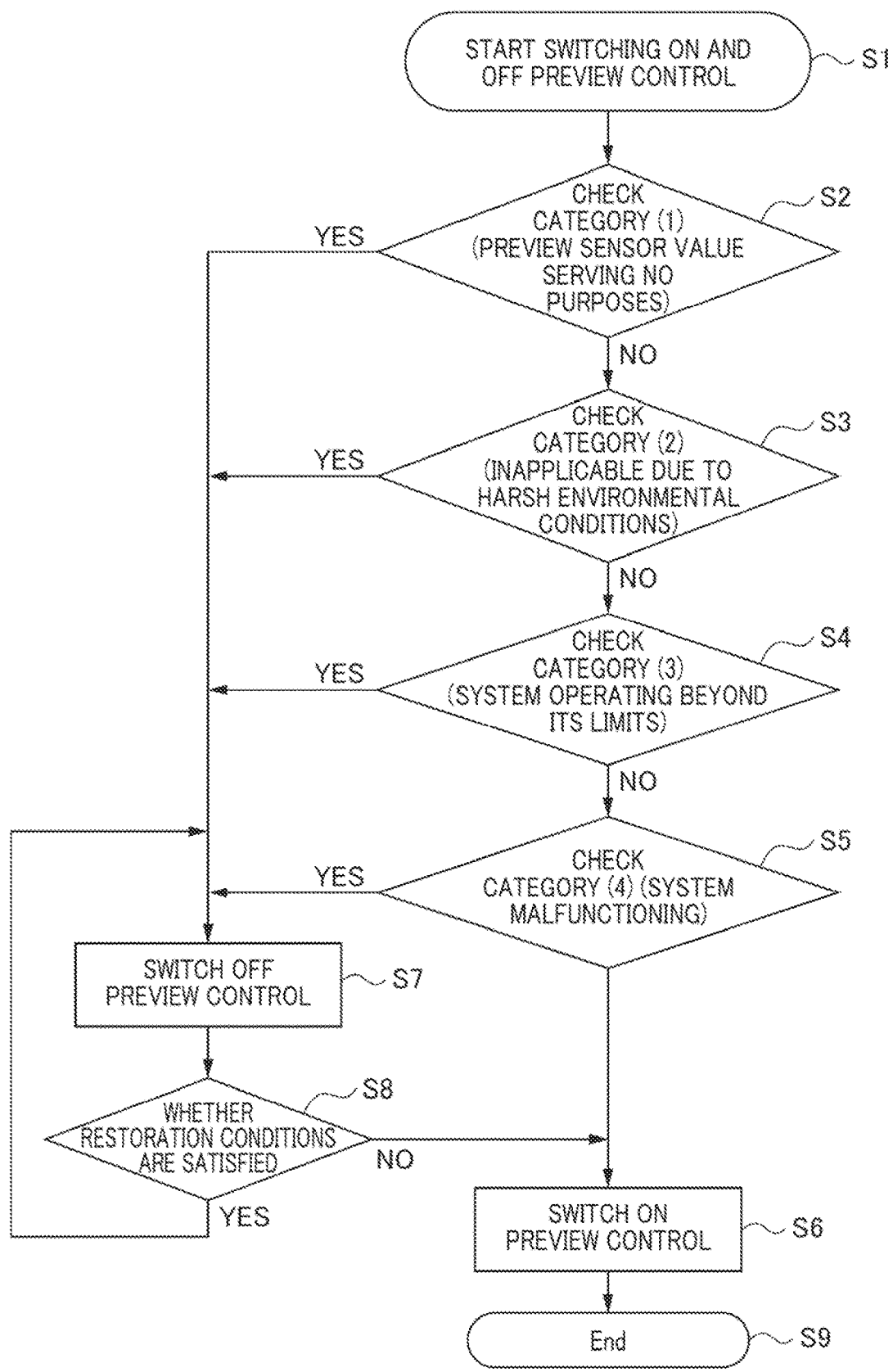
FIG. 4 is a flowchart illustrating a process of switching on and off the preview control.

Based on FIGS. 4 to 6, the flow of switching on and off the preview control and the content of the predetermined conditions will be described. FIG. 4 illustrates the flow of switching on and off the preview control. FIGS. 5 and 6 illustrate examples of predetermined conditions when switching on or off the preview control.

The flow of switching on and off the preview control is performed by checking if there is no reason to switch off the preview control, and if there is no such reason, the preview control is switched on. The reasons for switching off the preview control are classified into four categories. Therefore, checking of whether there is no reason to switch off the preview control is conducted in four stages. The following will be described in order.

(S1)

In Step 1 (S1), the flow of switching on and off the preview control starts.

(S2 and S7)

In Step 2 (S2), first, determination on Category (1) as illustrated in FIG. 5 is made. In Step 2 (S2), if it is determined that the preview sensor value serves no purposes, the determination in Step 2 (S2) will be "Yes". In this case, the process proceeds to Step 7 (S7). Then in Step 7 (S7), the preview control is switched off. Note that various determinations on switching on and off of the preview control can be made, for example, by the preview control unit 4.

On the other hand, if it is determined in Step 2 (S2) that the preview sensor value serves no purposes, the determination in Step 2 (S2) will be "No."

In this case, the process proceeds to Step 3 (S3).

(S3)

In Step 3 (S3), next, determination on Category (2) as illustrated in FIG. 5 is made. In Step 3 (S3), if it is determined that the preview sensor is inapplicable due to harsh environmental conditions, the determination in Step 3 (S3) will be "Yes". In this case, the process proceeds to Step 7 (S7). In Step 7 (S7), the preview control is switched off.

On the other hand, if it is not determined in Step 3 (S3) that the preview sensor is inapplicable due to harsh environmental conditions, the determination in Step 3 (S3) will be "No". In this case, the process proceeds to Step 4 (S4).

(S4)

In Step 4 (S4), next, determination on Category (3) as illustrated in FIG. 5 is made. In Step 4 (S4), if it is determined that the system is operating beyond its limits, the determination in Step 4 (S4) will be "Yes". In this case, the process proceeds to Step 7 (S7). In Step 7 (S7), the preview control is switched off.

In Step 4 (S4), if it is not determined that the system is operating beyond its limits, the determination in Step 4 (S4) will be "No". In this case, the process proceeds to Step 5 (S5).

(S5)

In Step 5 (S5), next, determination on Category (4) as illustrated in FIG. 5 is made. In Step 5 (S5), if it is determined that the system is malfunctioning, the determination in Step 5 (S5) will be "Yes". In this case, the process proceeds to Step 7 (S7). In Step 7 (S7), the preview control is switched off.

On the other hand, in Step 5 (S5), if it is not determined that the system is malfunctioning, the determination in Step 5 (S5) will be "No". In this case, the process proceeds to Step 6 (S6).

(S6)

In Step 6 (S6), the preview control is switched on. This is because the four categorized reasons for not switching on the preview control did not apply through the previous steps.

(S8)

Step S8 is a step of determining whether the preview control should be switched on when the preview control is switched off. The conditions for switching on the preview control when the preview control is switched off are referred to as restoration conditions. The restoration conditions will be described later.

(S9)

After the preview control is switched on in Step S6, the flow of switching on and off the preview control ends in Step S9. However, after the flow has ended, for example, monitoring of the situation of the vehicle V can also be continued. In this case, if necessary, the flow of switching on and off the preview control can also be restarted from Step S1. Note that such monitoring of the situation can be carried out, for example, through a situation monitoring unit (not illustrated) provided in the suspension system 3.

As described above, in the preview road surface detector 1 of the present embodiment, the preview control is switched off under predetermined conditions. Further, in correspondence with the preview control being switched off, the distance sensor 11 is deactivated.

Therefore, according to the preview road surface detector 1 of the present embodiment, the preview road surface detector 1 capable of discontinuing the preview control as predictive control can be provided, suppressing energy consumption required to determine whether the preview control should be discontinued. In other words, according the preview road surface detector 1 of to the present embodiment, the energy consumption of the system associated with the preview road surface detector 1 can be reduced. Further, according to the preview road surface detector 1 of the present embodiment, malfunctions of the preview road surface detector 1 can be suppressed by deactivating the distance sensor 11 under predetermined conditions.

(Predetermined Conditions) The predetermined conditions for deactivating the distance sensor 11 will be described below for each category. FIG. 5 is a diagram illustrating the content of categories (1) and (2) among the four predetermined conditions.

(Category (1))

Category (1) is a category that encompasses the situations where the preview sensor value serves no purposes. Examples of such situations are described as scene examples. The first scene is when the vehicle comes to a stop or the EPB (EPB: Electric Parking Brake) is in operation. In these situations, the vehicle is stationary. Therefore, control of the suspension using the preview sensor is unnecessary.

The determination to deactivate the preview sensor in this scene can be made, for example, as described below. Specifically, the preview sensor can be deactivated when the EPB is in operation or when the wheel speed sensor indicates zero for any of the wheels.

The second scene in Category (1) is the cases where the steering angle is equal to or greater than a certain degree. When the steering angle is equal to or greater than a certain degree, the vehicle V is in a situation such as getting into a garage or getting parked. In such situations, the vehicle V travels at low speed or covers only a short distance, in many cases. In such cases, control of the suspension using the preview sensor is unnecessary.

Further, when the steering angle is equal to or greater than a certain degree, the travel direction of the vehicle V significantly changes. Therefore, the anticipated road surface condition predicted by the preview road surface detector 1 may conceivably differ from the actual condition of the road surface on which the vehicle V travels. In such cases as well, control of the suspension using the preview sensor is unnecessary.

An example of the determination to deactivate the preview sensor in this scene is, for example, the case where the steering angle information is equal to or greater than a certain threshold, thus determining to deactivate the preview sensor.

The third scene in Category (1) is the case where the vehicle is moving in reverse. The preview road surface detector 1 typically detects the road surface condition ahead of the vehicle V. Therefore, when moving in reverse, control of the suspension using the preview sensor is unnecessary.

An example of the determination to deactivate the preview sensor in this scene is, for example, the case of determining to deactivate the preview sensor while the reverse operation flag is being received. Note that the reverse operation flag can be received, for example, through Controller Area Network (CAN) to receive REVERSE F (reverse flag) of the Motion Active Electric Power Steering (MAEPS) in the Vehicle Stability Assist (VSA) system.

As described above, in the preview road surface detector 1, the distance sensor 11 can be deactivated in at least one of the following situations: when the vehicle comes to a stop, when the steering angle is equal to or greater than a predetermined angle, or when the vehicle moves in reverse. As a result, energy consumption of the system can be reduced when the intended use of the calculated road surface distance is minimal.

(Category (2))

Category (2) is a category that encompasses the situations where the preview sensor is inapplicable due to harsh environmental conditions. Examples of such situations are provided as scene examples. Examples of the scenes in Category (2) include snow, road surface freezing, and road surface conditions changing.

"Road surface conditions changing" refers to cases where the road surface conditions change when the vehicle crosses over the road surface such as the muddy road surface or sandy beach. In other words, "road surface conditions changing" refers to situations where the vehicle crosses over road surfaces that are not solidified, for example. In such scenes, it is difficult to accurately predict the road surface conditions. Therefore, control of the suspension using the preview sensor is unnecessary.

The determination to deactivate the preview sensor in such scenes can be made, for example, as described below. Specifically, snow conditions may be determined by referring to weather information from the car navigation system. Road surface freezing may be determined by obtaining temperature from the outside temperature sensor. More specifically, in order to determine road surface freezing, a threshold is set in advance based on the outside air temperature measured by the outside temperature sensor. When the outside air temperature is less than or equal to the threshold, the road surface can be determined to be freezing. This threshold can, for example, be set at 2 degrees Celsius or below.

In scenes where the road surface condition changes as the vehicle crosses over, such as when encountering the muddy road surface or sandy beach, determination to deactivate the preview sensor can be made, for example, when the body G-force continues to be equal to or greater than a certain threshold even though the preview control is active.

As described above, in the preview road surface detector 1, the distance sensor is deactivated when the surrounding weather is determined to be snow or when the outside temperature is less than or equal to a predetermined temperature. Alternatively, the distance sensor can be deactivated when the ABS (Anti-lock Braking System) or VSA (Vehicle Stability Assist) is in operation.

Implementation of such measures can suppress malfunctions of the suspension system, which may occur when using the distance sensor 11 in situations where extreme environmental conditions are anticipated. Further, the energy consumed by the system can be reduced in situations where control of the suspension using the preview sensor is unnecessary.

(Category (3))

Continuing from Categories (1) and (2), Categories (3) and (4) will be described. Categories (3) and (4) are described based on FIG. 6. Category (3) is a category that encompasses the situations of the system operating beyond its limits. Examples of such situations are provided as scene examples. Examples of the scenes in Category (3) may include the cases of driving on rough roads such as mountain tracks.

In such scenes, it is difficult to accurately predict the road surface conditions. Further, it is difficult to predict the posture of the vehicle V in motion. Therefore, control of the suspension using the preview sensor is unnecessary.

The determination to deactivate the preview sensor in such scenes can be made, for example, as described below. Specifically, in the vehicle V, in the case where the acceleration of the vehicle body B continues to be equal to or greater than a certain threshold, the preview sensor can be deactivated.

As described above, in the preview road surface detector 1, the distance sensor 11 can be deactivated when the vertical acceleration of the vehicle body B continues to be equal to or greater than a certain threshold for a predetermined period of time or longer. Further, in the preview road surface detector 1, the distance sensor 11 can be deactivated when the voltage value of the battery is less than or equal to a predetermined value.

Thus, when the system is operating beyond its limits, system malfunctions due to using the distance sensor 11 can be suppressed. Further, the energy consumption of the system can be reduced by deactivating the distance sensor 11.

(Category (4))

Category (4) is a category that encompasses the situations related to system malfunctions. Examples of such situations are provided as scene examples. Examples of the scenes in Category (4) include cases of dirt or other contaminants adhering to the distance sensor 11, and cases where the distance sensor 11 is malfunctioning. In such scenes, it is difficult to accurately predict the road surface conditions. Therefore, control of the suspension using the preview sensor is unnecessary.

The determination to deactivate the preview sensor in such scenes can be made, for example, as described below. Specifically, determination on dirt or other contaminants adhering to the sensor can be made by checking whether the sensor value is over or under, or whether the sensor value remains constant for a certain period of time. Determination on malfunctions of the sensor can be made by checking whether there is no response from the sensor.

As described above, in the preview road surface detector 1, the distance sensor 11 is deactivated when the detection values of the distance sensor 11 is at least one of constant, under, or over for a predetermined period of time. Thus, when system malfunctions are predicted, system malfunctions due to using the distance sensor 11 can be suppressed. Further, the energy consumption of the system can be reduced by deactivating the distance sensor 11.

(Restoration of Preview Control)

The above description has primarily focused on the flow from starting to switch on and off the preview control until the preview control is switched off. In the preview road surface detector 1, the preview control can be switched on when the predetermined conditions are resolved.

(S8)

Step S8 is a step of determining whether the preview control should be switched on when the preview control is switched off. If the preview control is switched off in Step S7 as a result of determinations made in Steps S2 to S5, then the process proceeds to Step S8, in which determination is made on whether the restoration conditions are satisfied. In Step S8, if it is determined that the restoration conditions are satisfied, the process proceeds to Step S6, and the preview control is switched on. On the other hand, if it is determined that the restoration conditions are not satisfied, the process returns to Step S7, and the preview control remains off. When the preview control remains off, for example, monitoring of the situation of the vehicle V can also be continued. In this case, once the restoration conditions are satisfied, the process proceeds from Step S8 to S6, allowing the preview control to be switched on. Note that such monitoring of the situations can be carried out, for example, through a situation monitoring unit (not illustrated) provided in the suspension system 3. The restoration conditions will be specifically described below.

As mentioned above, the preview control is switched off in Step S7 based on determinations made in Steps S2 to S5, satisfying the predetermined conditions in Categories (1) to (4), respectively. Therefore, when the predetermined conditions are no longer satisfied, it is preferable to switch on the preview control.

For example, if the preview control is switched off due to satisfying the predetermined conditions in Category (1), the preview control can be switched on when the vehicle starts moving after coming to a stop, or when the vehicle moves ahead after moving in reverse. Similarly, the switched-off preview control can be switched on, for example, when the steering angle having been equal to or greater than the threshold falls below the threshold. As a result of switching on the preview control, the distance sensor 11 is also activated.

In this manner, changes in the factors having switched off the preview control are monitored, and the preview control can also be switched on when the factors having switched off the preview control are resolved. This allows the suspension system 3 to restore the preview control at appropriate timing.

Further, for example, if the preview control is switched off as a result of satisfying the predetermined conditions in Categories (2) to (3), the preview control can also be switched on when the vehicle V comes to a stop, in addition to the case of resolving the predetermined conditions. This allows for activating the distance sensor 11 and attempting to restore the preview control at appropriate timing.

Examples of restoration will be described below for each category, referring to FIGS. 5 and 6. As mentioned earlier, the restoration conditions, or conditions for switching on the preview control, are primarily the resolution of the conditions for switching off the preview control.

(Category 1)

For example, in Category 1, if the preview control is switched off as a result of the vehicle coming to a stop, the switched-off preview control can be switched on when it is determined, using the wheel speed sensor, that the vehicle is in motion. Similarly, if the preview control is switched off as a result of the EPB (Electric Parking Brake) being in operation, the preview control can be switched on when the EPB stops operation.

Further, if the preview control is switched off as a result of the steering angle being equal to or greater than the threshold, the switched-off preview control can be switched on when the steering angle falls below the threshold.

Also, if the preview control is switched off as a result of the vehicle moving in reverse, the switched-off preview control can be switched on when the reverse operation flag goes off, thus determining that the vehicle V is moving ahead.

(Categories 2 and 3)

The same applies to Categories 2 and 3. For example, if the preview control is switched off as a result of the weather information from the car navigation system indicating snow, the preview control can be switched on when the weather information changes to something other than snow. Further, if the preview control is switched off as a result of the evaluation value being in a predetermined relationship with a pre-set threshold, the preview control can be switched on when this relationship is resolved.

(Category 4)

For Category 4 as well, the preview control can be switched on when the predetermined conditions having been satisfied to switch off the preview control are no longer satisfied. However, the cases of dirt or other contaminants adhering to the sensor and the cases of the sensor malfunctioning, which are classified under Category 4, are preferably handled by an approach different from the other categories. Specifically, in the case of having determined that dirt or other contaminants adhere to the sensor, based on the sensor value being over or under, for example, the sensor values are obtained at a regular interval. Then, when sensor values are successfully obtained within a specified range, it is determined that the adherence of dirt to the sensor has been resolved. Then the preview control can be switched on. The regular interval can be, for example, every 30 seconds.

Similarly, in the case of having determined that dirt or other contaminants adhere to the sensor, based on the sensor values remaining unchanged for a certain period of time, for example, a plurality of sensor values are obtained at a regular interval. Then, when the values change within a specified range, it is determined that the adherence of contaminants to the sensor has been resolved. Then the preview control can be switched on. The regular interval can be, for example, three times every 30 seconds.

In the case of having determined that the sensor is malfunctioning based on no responses received from the sensor, for example, the preview control is not restored, or not switched on, until reactivated by ignition, but the preview control is switched on when reactivated by ignition.

As another example, in the case of having determined that the sensor is malfunctioning based on no responses received from the sensor, the preview control can be switched on when the vehicle V comes to a stop thereafter. This is because the sensor may restart responding when the vehicle V comes to a stop.

As described above, in the cases of dirt or other contaminants adhering to the sensor and the cases of the sensor malfunctioning, the approach for restoration adopted in Category (4) can be different from the other categories. This is because it is difficult to determine dirt or other contaminants adhering to the sensor and the sensor malfunctioning, based on evaluation values other than the sensor values. This is also because dirt or other contaminants adhering to the sensor and the sensor malfunctioning should be directly determined based on the sensor values, which is also accurate.

(Suspension Controller)

The suspension controller will now be described. Specific examples of the suspension controller may include the suspension control unit 5 illustrated in FIG. 1. The suspension control unit 5 controls operations of the active suspension. Specific examples of the active suspension may include the active suspension D. The suspension control unit 5 controls operations of the active suspension D, based on the road surface distance L1 calculated using the preview road surface detector 1.

The suspension control unit 5 of the present invention controls operations of the suspension system 3 by using skyhook control or damping control when the distance sensor 11 is deactivated. As a result, comfort can be maintained through feedback control, even in a state where the distance sensor 11 is deactivated and the preview-based suspension control is disabled.

(Preview Road Surface Detection Method)

Using the preview road surface detector 1 of the present embodiment, the following preview road surface detection method can also be executed. Specifically, a preview road surface can be detected with a method that includes: a detecting step of detecting a value related to a distance between the vehicle body member 30 and the measurement point P on the road surface R ahead of the vehicle, the measurement point P corresponding to at least the central portion 43 of the road surface contact portion 41 of the wheel W; and a calculating step of calculating the road surface distance L1, which is the distance from the vehicle body member 30 to the measurement point P, based on the detection value detected in the detecting step, in which the method further includes: a situation monitoring step of monitoring the situation of the vehicle V; and a determining step of determining whether the detecting step should be executed, based on the situation of the vehicle V monitored in the situation monitoring step.

The embodiments of the present invention have been described above; however, the present invention is not limited to the aforementioned embodiments, and various modifications, alterations, and combinations are possible.

EXPLANATION OF REFERENCE NUMERALS

1 preview road surface detector
3 suspension system
4 preview control unit
5 suspension control unit (suspension controller)
11 distance sensor
12 distance calculator
20 exterior member
30 vehicle body member
41 road surface contact portion
43 central portion
B vehicle body
D active suspension (active suspension)
D1 suspension spring
D2 variable damper
L1 road surface distance
L2 road surface displacement
L3 vehicle height
L4 road surface contact width
P measurement point
R road surface
V vehicle
W wheel
W1 spring
W2 damper

What is claimed is:

1. A preview road surface detector, comprising:
   a distance sensor provided on a vehicle body member, the distance sensor detecting a value related to a distance between the vehicle body member and a measurement point on a road surface ahead of a vehicle, the measurement point corresponding to at least part of a road surface contact portion of a wheel; and
   a distance calculator that calculates a road surface distance as the distance from the vehicle body member to the measurement point, based on a detection value detected by the distance sensor,
   wherein the distance sensor is deactivated under a predetermined condition, and
   the distance sensor is deactivated in at least one situation of: when the vehicle comes to a stop, when a steering angle is equal to or greater than a predetermined angle, or when the vehicle moves in reverse.

2. The preview road surface detector according to claim 1, wherein the distance sensor is activated when the vehicle moves ahead after coming to a stop, when the vehicle moves ahead after moving in reverse, or when the steering angle having been equal to or greater than a predetermined angle falls below the predetermined angle.

3. The preview road surface detector according to claim 1, wherein the predetermined condition includes at least one of:
   a condition indicating a low reliability of the road surface distance calculated; or a condition indicating a case in which control of the vehicle body member using the road surface distance calculated is unnecessary.

4. A preview road surface detector, comprising:
   a distance sensor provided on a vehicle body member the distance sensor detecting a value related to a distance between the vehicle body member and a measurement point on a road surface ahead of a vehicle, the measurement point corresponding to at least part of a road surface contact portion of a wheel; and
   a distance calculator that calculates a road surface distance as the distance from the vehicle body member to the measurement point, based on a detection value detected by the distance sensor,
   wherein the distance sensor is deactivated under a predetermined condition, and
   wherein the distance sensor is deactivated when vertical acceleration of the vehicle body member continues to be equal to or greater than a threshold for a predetermined period of time or longer.

5. The preview road surface detector according to claim 4, wherein, in a case in which the distance sensor is deactivated in claim 4,
   the distance sensor is activated when a predetermined condition having deactivated the distance sensor is resolved, or
   when the vehicle comes to a stop after the distance sensor is deactivated.

6. A preview road surface detector, comprising:
   a distance sensor provided on a vehicle body member, the distance sensor detecting a value related to a distance between the vehicle body member and a measurement point on a road surface ahead of a vehicle, the measurement point corresponding to at least part of a road surface contact portion of a wheel; and
   a distance calculator that calculates a road surface distance as the distance from the vehicle body member to the measurement point, based on a detection value detected by the distance sensor
   wherein the distance sensor is deactivated under a predetermined condition, and
   wherein the distance sensor is deactivated when a weather around the vehicle is determined to be snow, when an outside temperature of the vehicle is less than or equal to a predetermined temperature, or when at least one of ABS or VSA is in operation.

7. A preview road surface detector, comprising:
a distance sensor provided on a vehicle body member the distance sensor detecting a value related to a distance between the vehicle body member and a measurement point on a road surface ahead of a vehicle, the measurement point corresponding to at least part of a road surface contact portion of a wheel; and
a distance calculator that calculates a road surface distance as the distance from the vehicle body member to the measurement point, based on a detection value detected by the distance sensor,
wherein the distance sensor is deactivated under a predetermined condition, and
wherein the distance sensor is deactivated when the detection value of the distance sensor is at least one of constant, under, or over for a predetermined period of time or longer.

8. A suspension controller that controls an operation of an active suspension, based on a road surface distance calculated using a preview road surface detector, the preview road surface detector comprising;
a distance sensor provided on a vehicle body member, the distance sensor detecting a value related to a distance between the vehicle body member and a measurement point on a road surface ahead of a vehicle, the measurement point corresponding to at least part of a road surface contact portion of a wheel; and
a distance calculator that calculates a road surface distance as the distance from the vehicle body member to the measurement point, based on a detection value detected by the distance sensor,
wherein the distance sensor is deactivated under a predetermined condition, and
wherein, when the distance sensor is deactivated, the suspension controller controls an operation of the active suspension by way of skyhook control or damping control.

9. A preview road surface detection method, comprising:
a detecting step of detecting a value related to a distance between a vehicle body member and a measurement point on a road surface ahead of a vehicle, the measurement point corresponding to at least a central portion of a road surface contact portion of a wheel; and
a calculating step of calculating a road surface distance, which is the distance from the vehicle body member to the measurement point, based on a detection value detected in the detecting step,
wherein the method further comprises:
a situation monitoring step of monitoring a situation of the vehicle; and
a determining step of determining whether the detecting step should be executed, based on the situation of the vehicle monitored in the situation monitoring step.

* * * * *